United States Patent [19]
Ingistov

[11] Patent Number: 5,961,279
[45] Date of Patent: Oct. 5, 1999

[54] TURBINE POWER PLANT HAVING MINIMAL-CONTACT BRUSH SEAL AUGMENTED LABYRINTH SEAL

[75] Inventor: Steve Ingistov, Los Angeles, Calif.

[73] Assignee: Atlantic Richfield Company, Los Angeles, Calif.

[21] Appl. No.: 08/892,738

[22] Filed: Jul. 15, 1997

Related U.S. Application Data

[63] Continuation of application No. 08/656,564, May 31, 1996, abandoned.

[51] Int. Cl.$^6$ .................................................. F01D 11/00
[52] U.S. Cl. ................................ 415/170.1; 415/173.1; 277/53
[58] Field of Search ........................... 415/170.1, 173.5, 415/173.1, 174.5; 277/53

[56] References Cited

U.S. PATENT DOCUMENTS

| | | | |
|---|---|---|---|
| 4,979,755 | 12/1990 | Lebreton | 415/173.5 |
| 5,205,706 | 4/1993 | Belcher | 415/170.1 |
| 5,335,920 | 8/1994 | Tseng et al. | 277/53 |
| 5,501,573 | 3/1996 | Sanders | 277/53 |
| 5,522,698 | 6/1996 | Butler et al. | 415/170.1 |
| 5,630,590 | 5/1997 | Bouchard et al. | 415/170.1 |
| 5,688,105 | 11/1997 | Hoffelner | 415/170.1 |
| 5,704,760 | 1/1998 | Bouchard et al. | 415/170.1 |
| 5,749,584 | 5/1998 | Skinner et al. | 277/53 |

OTHER PUBLICATIONS

"Brush Seals" brochure; Pratt & Whitney, North Berwick, Maine; 2 pp.; Sep., 1993.

Primary Examiner—John Kwon

[57] ABSTRACT

A stationary gas turbine engine includes an axial compressor; a turbine; a stationary inner barrel downstream of the compressor; a brush seal including a ring-shaped holder supported by the inner barrel, and a multiplicity of inwardly extending bristle members having an ambient temperature clearance of not less than 0.015 percent of a rotor land region diameter of the rotor under cold conditions for restricting air passage into the chamber from the compressor. The flow of cooling air from the chamber is preferably alterable by a fluid port extending through one wall of the inner barrel, the fluid port being connected to an auxiliary source of pressure air external of the inner barrel, whereby pressure air from the auxiliary source augments the flow of cooling air from the chamber. A calibrated needle valve can adjustably restrict the flow of auxiliary air for controlling a monitored operating parameter such as the temperature within the chamber. The engine can have an outer barrel surrounding the inner barrel, air flowing therebetween toward the combustor, and including a radial fluid port, and a fluid conduit connected between the passage and the fluid port, the auxiliary source being connected to the fluid port external of the outer barrel. A method for controlling cooling air flow in the power plant includes providing the brush seal; connecting the brush seal in augmenting relation to the labyrinth seal; and spacing the bristles from the land region of the rotor.

12 Claims, 2 Drawing Sheets

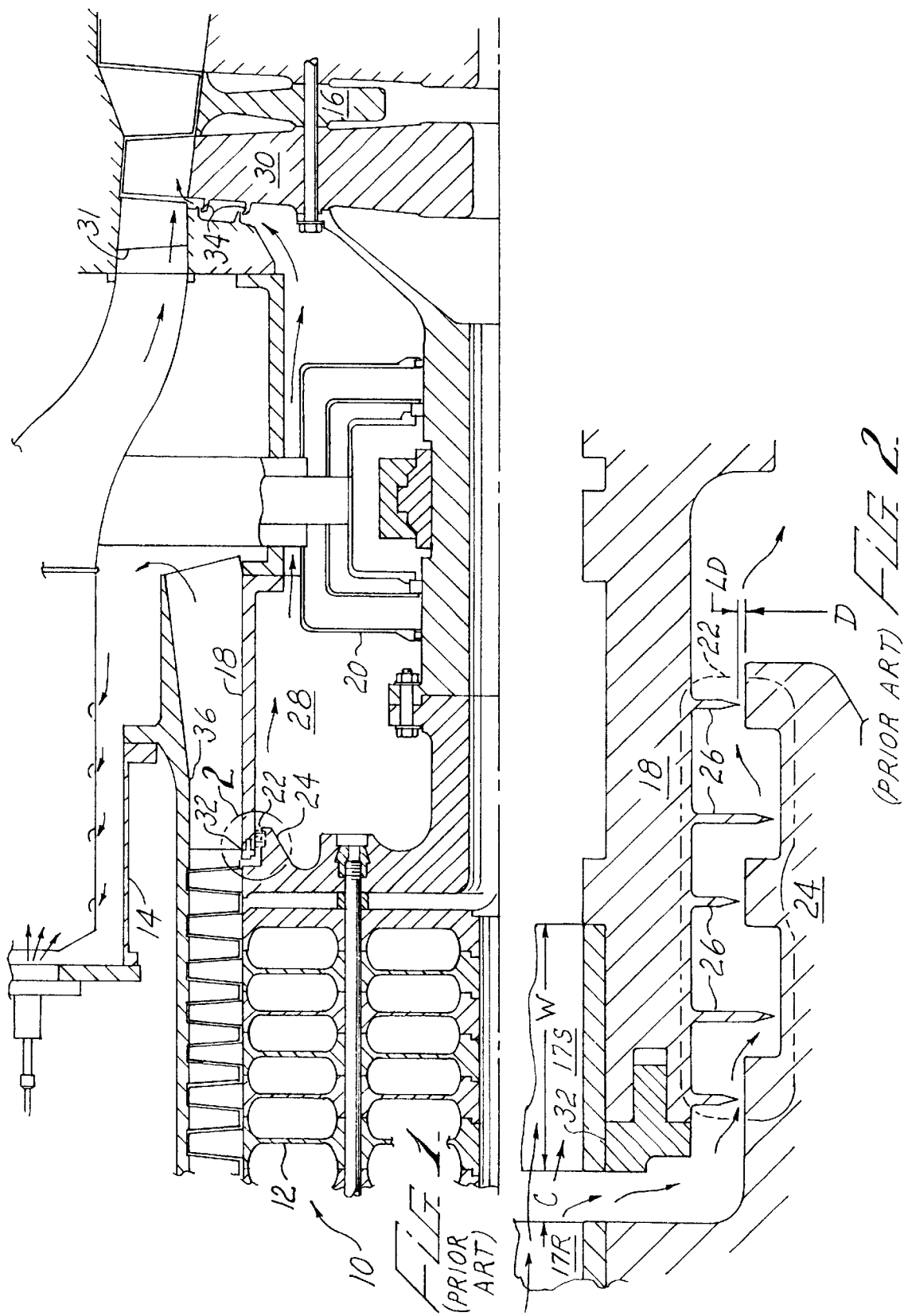

TURBINE POWER PLANT HAVING MINIMAL-CONTACT BRUSH SEAL AUGMENTED LABYRINTH SEAL

This application is a continuation of application Ser. No. 08/656,564, filed May 31, 1996, abandoned.

BACKGROUND

The present invention relates to turbine power plants and more particularly to large, stationary turbine power generators of the type used for utility services.

A typical stationary turbine power plant, known as Model Series 7001 simple cycle, single shaft, heavy duty gas turbine (Frame-7 machine), is available from General Electric of Schenectady, N.Y. In this and similar gas turbines, a seal is located between an axial compressor rotor and a stationary inner barrel member, a chamber within the inner barrel member being supplied with cooling air from the last stage of the compressor by a controlled amount of leakage through the seal. The cooling air is then utilized for cooling of a first turbine stage of the machine. A set of rotor bearings is located in the cavity.

Leakage in excess of a predetermined amount that is required for cooling of the turbine becomes parasitic and contributes to inefficiency of the machine. This is a serious problem in turbine power plants of the prior art, in that the labyrinth seals degrade in operation because of thermal expansions and other factors that cause knife-edge members and adjacent rotating elements of the seals to be worn away quickly, particularly during shut-down sequences. This is caused, for example, by shrinkage of the inner barrel member being more rapid than shrinkage of the rotor at the seal to the rotor being more massive. Thus in the frame-7 machines, the bypass air flow increases to approximately 100,000 lb/hr from the 30,000 lb/hr that is considered optimal. Consequently, there is a loss of power that is believed to be between 1.5 MW and 3.0 MW.

Brush seals for gas-turbine engines are known, being disclosed, for example in "Brush Seals," *Directions*, September 1993. As disclosed therein, a brush seal consists of densely packed metallic bristles that are welded between a down-stream backing plate and an up-stream side plate. In a typical round seal for aircraft turbine applications, the plates are ring-shaped, the bristles extending radially inwardly at a trailing lay angle and making an interference contact with a rotor element, so that the bristles become curved and follow the rotor as it grows and shrinks during engine operation.

Brush seals have not been applied to existing large power plant turbines for a number of reasons. For example, the existing rotor components, being made from elements of low carbon steel alloys that are selected for certain thermal expansion properties, are believed to be unsuitable as wear surfaces for contact by the bristles, particularly during the extended operation cycles that are demanded of stationary power plants. Suitable hardening of applicable compressor rotor members is believed to be prohibitively expensive, particularly in existing equipment.

Thus there is a need for an improved rotor seal for large stationary plants, that overcomes the disadvantages of the prior art.

SUMMARY

The present invention meets this need by providing a turbine power plant with a combination brush and labyrinth compressor seal wherein the brush seal operates in a non-contact mode following start-up. In one aspect of the invention, a stationary gas turbine engine for the power plant includes a multistage axial compressor that has a rotor having a cylindrical land region downstream of a last-stage of the compressor, the land region having an outside diameter D; a turbine shaft-coupled to the rotor of the compressor; a combustor fluid-coupled between the compressor and the turbine; a stationary inner barrel downstream of the compressor, air flowing from the compressor to the combustor passing outside of the inner barrel, a chamber within the inner barrel forming a passage for cooling air from the compressor, the cooling air flowing from the chamber and being mixed with combustion gases upstream of the turbine; a brush seal for restricting air passage into the chamber from the compressor, the brush seal including a ring-shaped holder; a multiplicity of bristle members extending radially inwardly from the holder toward the land region of the rotor, outer extremities of the bristle members being rigidly retained relative to the holder; and means for fastening the holder to the inner barrel, wherein, when the power plant is inactive, the bristles have an ambient temperature clearance of not less than 0.015 percent of the diameter D from the land region of the rotor.

The engine can further include means for selectively altering the flow of cooling air from the chamber, including a passage extending through one wall of the inner barrel; means for connecting the fluid port to an auxiliary source of pressure air external of the inner barrel, whereby pressure air from the auxiliary source augments the flow of cooling air from the chamber; and means for changeably restricting flow of pressure air into the chamber from the auxiliary source of pressure air. The compressor can provide at least a portion of the auxiliary source of pressure air. The means for changeably restricting can include means for removably mounting a device being a plug or a jet in the passage.

Preferably the means for selectively altering the flow of cooling air also includes a valve for adjustably restricting flow of pressure air into the chamber from the auxiliary source of pressure air; and means for monitoring an operating parameter of the engine, the operating parameter being responsive to the flow of cooling air from the chamber. The valve is preferably a calibrated needle valve for facilitating repeatable control of the cooling flow. The means for monitoring can include a temperature sensor for indicating temperatures within the chamber. The engine can also have an outer barrel surrounding the inner barrel and including a fluid port extending radially through one wall thereof, the gas flow from the compressor to the combustor passing between the outer barrel and the inner barrel, the means for connecting the passage including a fluid conduit connected between the passage and the fluid port, and means for connecting the auxiliary source of pressure air to the fluid port external of the outer barrel.

The engine can further include an insert ring connecting segments of the inner barrel, the insert ring being located proximate the land region of the rotor, the means for fastening the brush seal to the inner barrel including the holder being fastened to the insert ring by a plurality of threaded fasteners. Preferably the brush seal, including the holder thereof, is segmented for facilitating assembly with the insert ring.

In another aspect of the invention, a turbine power plant improvement includes a brush seal connected to a stationary barrel member between an axial compressor outlet and a cavity within the barrel member for augmenting a labyrinth seal that limits the flow of cooling air into the cavity, the brush seal having a ring-shaped holder, a multiplicity of bristle members being rigidly anchored to the holder and extending radially inwardly therefrom toward a rotor land region, wherein the bristles have an ambient temperature clearance of not less than 0.015 percent of a diameter D of the land region when the power plant is inactive.

In a further aspect of the invention, a method for controlling cooling air flow in a turbine power plant having a multistage axial compressor, a turbine shaft-coupled to a rotor of the compressor, a combustor fluid coupled between the compressor and the turbine, and a labyrinth seal between the rotor and a stationary inner barrel member, the rotor having a cylindrical land region of diameter D, includes the steps of:

(a) providing a brush seal having a ring-shaped holder, a multiplicity of bristle members extending radially inwardly from the holder toward the land region of the rotor, outer extremities of the bristle members being rigidly retained relative to the holder;

(b) connecting the brush seal in augmenting relation to the labyrinth seal; and (c) spacing the bristle members from the land region of the rotor by an ambient temperature clearance of not less than 0.015 percent of the diameter D when the power plant is inactive.

The power plant can include an insert ring fastened to the inner barrel in axially spaced relation to a portion of the rotor member, the method including the further steps of:

(a) removing the insert ring from the inner barrel member;

(b) providing an adapter ring;

(c) mounting the brush seal to the adapter ring; and (d) fastening the adapter ring to the inner barrel member in place of the insert ring.

The step of providing the adapter ring can include the step of modifying the insert ring. The method can include the further steps of:

(a) providing an auxiliary source of pressure air;

(b) fluid-connecting the auxiliary source to an interior cavity portion of the inner barrel member for augmenting the flow of cooling air;

(c) connecting an adjustable valve between the auxiliary source and the inner barrel member for variably restricting air flow from the auxiliary source and the inner barrel member;

(d) monitoring an operating parameter of the power plant; and (e) adjusting the adjustable valve in response to changes in the operating parameter.

DRAWINGS

These and other features, aspects, and advantages of the present invention will become better understood with reference to the following description, appended claims, and accompanying drawings, where:

FIG. 1 is a fragmentary sectional elevational view of a prior art stationary turbine power plant machine;

FIG. 2 is a detail sectional view of the prior art machine of FIG. 1 within region 2 thereof;

DESCRIPTION

Figure 3:
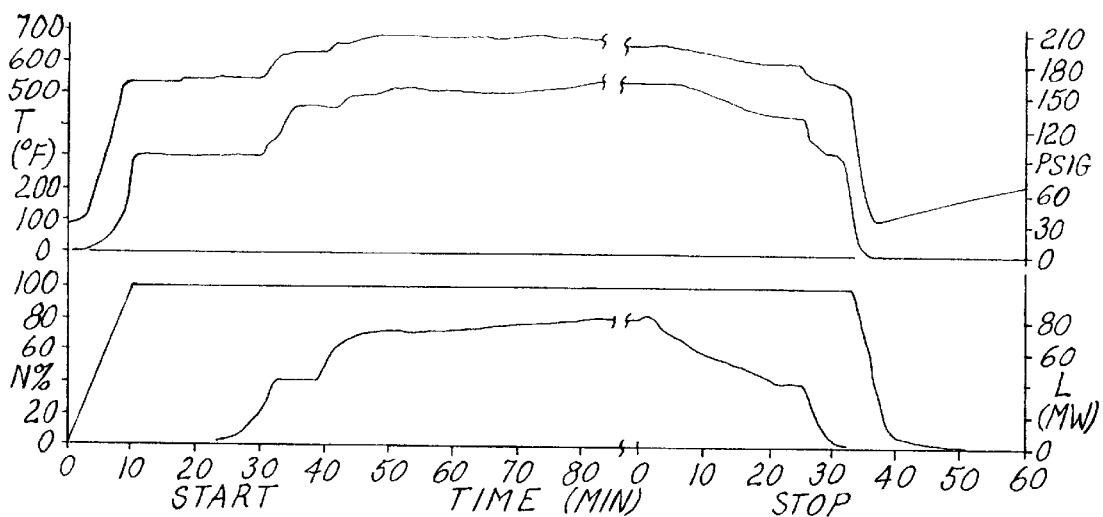
FIG. 3 is a graph showing start-up and shut-down compressor discharge pressure and temperature profiles of the prior art machine of FIG. 1.

The present invention is directed to a turbine power plant having improved control of cooling bypass air. With reference to FIGS. 1–3 of the drawings, a prior art gas turbine machine 10 has a multi-stage axial compressor 12, a combustor 14, and a turbine 16 that is shaft-coupled to the compressor 12 within an inner barrel member 24, a set of rotor bearings also being mounted within a bearing housing 20 that is located within the barrel member 24. The compressor 12 has a last or seventeenth stage 17R on a rotor member 24, and an associated stator 17S that supportively contacts the inner barrel member 18. A labyrinth seal 22 is located between the rotor member 24 and the barrel member 18, the seal 22 including a plurality of stationary knife-edge members 26 projecting inwardly from the barrel member 18 toward a series of radially offset cylindrical portions of the rotor member 18. A small annular clearance normally exists between each knife-edge member 26 and the rotor member 18 as indicated by a radial gap distance LD, the distance LD being made approximately 0.030 inch at manufacture. A chamber 28 is formed within the barrel member 18, being supplied with cooling air from the last stage of the compressor 12 by a controlled amount of leakage through the labyrinth seal 22. The cooling air, after passing the rotor bearing housing 20, flows outwardly in front of a first wheel 30 of the turbine 16 and mixes with high-temperature gases passing from the combustor 14 through a nozzle block 31. The barrel member 18 can be segmented, being maintained in alignment by an interlocking insert ring 32 that also supports a final stator member 34 of the compressor 12. Typically, the inner barrel member 18 is formed by a pair of semi-circular segments, the insert ring 32 also being formed in three segments that overlap joints between the segments of the barrel member. The insert ring 32 is axially spaced from a portion of the rotor member 24 by a distance C through which the cooling air flows toward the labyrinth seal 22, the distance C corresponding to a space between the rotor 17R and the stator 17S, the stator 17S also having a width W. The machine 10 under design conditions produces air flow at a pressure of approximately 167 psi gage and a temperature of approximately 675° F. at the exit of the compressor 12, the main portion of the flow being between the inner barrel member 18 and an outer barrel member 36 that surrounds the inner barrel member 18. A radially spaced pair of "angel wings" 34 project forwardly toward the compressor 12 from the first wheel 30 for limiting cooling air flow from the chamber 28 to the turbine 16. The chamber 28 within the inner barrel member 18 is intended to be maintained at a pressure of proximately 82 psi gage by the flow of cooling air through the labyrinth seal 22.

The turbine machine 10, being of the type that is commercially available as Series 7001 heavy duty gas turbine from the previously identified General Electric Corp., has a somewhat protracted start-up sequence that lasts over one hour and a shut-down sequence that lasts approximately one hour as characterized in FIG. 3 by associated discharge pressures and temperatures of the compressor 12. FIG. 3 also includes power loading in megawatts and rotational speed as a percentage of rated speed for the start-up and shut-down sequences, plotted against time. Typically, there is significant wear of the knife edge members 26 against the rotor member 24 during portions of the shut-down sequence from the as manufactured condition, the distance LD rapidly increasing to between approximately 0.070 inch and approximately 0.110 inch. This increased clearance adversely affects performance of the machine 10 by lowering the flow of pressurized air into the combustor 14 as well as excessively lowering the turbine inlet temperature (by mixing the low temperature stream of compressed cooling air with the stream of hot combustion gases from the combustor 14).

Figure 4:
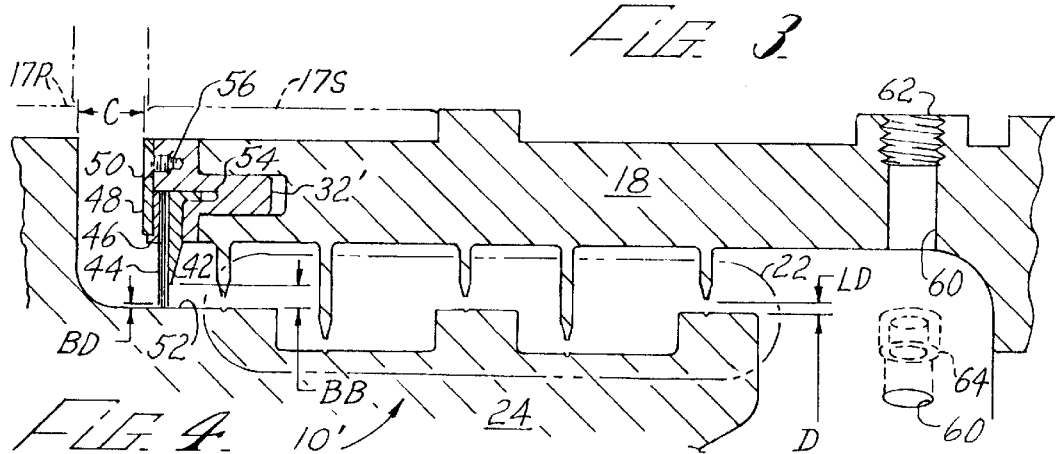
FIG. 4 is a sectional view as in FIG. 2, showing the machine as improved according to the present invention.
Figure 5:
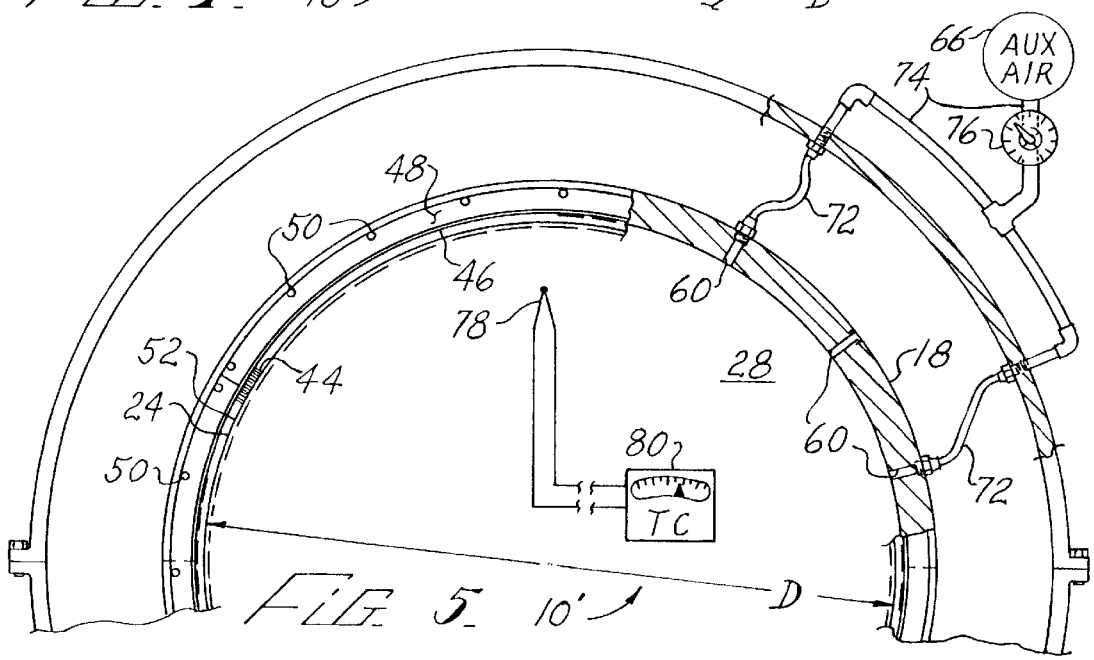
FIG. 5 is a lateral sectional diagrammic view of the machine of FIG. 4.

According to the present invention, and with further reference to FIGS. 4 and 5, the machine, designated 10', is provided with a brush seal 40 for augmenting the labyrinth seal 22. The brush seal 40 includes a backing plate 42, a multiplicity of tightly packed bristle members 44, and a cover plate 46. The bristle members 44 are clamped between the backing plate 42 and the cover plate 46, outer extremities of the bristle members being positively anchored to the plates 24 and 46 by welding or other suitable means. The bristle members 44 are typically very thin, being formed of a high-strength metal alloy, and closely packed at a density of approximately 4,500 per square inch.

In an exemplary configuration of the machine 10', a retainer plate 48 holds the brush seal 40 in fixed relation to the barrel member 18 by interlocking engagement with a counterpart of the insert ring, designated adapter ring 32', the backing plate 42 having a generally L-shaped cross-section, one leg of which axially projects into the adapter ring 32'. The retainer plate 48 is fastened to the insert ring 32' by a plurality of threaded fasteners 50. In the exemplary configuration of FIG. 4, the fasteners 50 are conventional undercut flat head machine screws having a thread diameter of approximately 0.099 inch, being spaced circumferentially not more than 6 inches on center, and staked in place. As further shown in FIG. 4, the bristle members 44 are located in spaced relation to a land region 52 of the rotor member 24, the land region having a diameter D, the bristle members 44 being radially spaced at a distance BD from the land region 52. Thus the brush seal 40 is fluid-connected in series with the labyrinth seal In a "cold" condition of the machine 10', the distance BD is preferably approximately 0.010 inch for preventing unwanted contact between the bristle members 44 and the rotor member 24. It is contemplated that momentary contact between the bristle members 44 and the rotor member 24 may occur during the shut-down sequence as explained above, but that no such contact will occur either during the initial portion of the start-up sequence or during steady-state full load operation of the machine 10'. It is believed that the preferred avoidance of continuous brush contact is attained when the "cold" clearance (with the rotor member 18 stationary) is not less than 0.015 percent of the diameter D. In the case of the "Frame-7 machine", the diameter D is approximately 50.5 inches; accordingly, the distance BD is preferably not less than 0.00757 inch, being more preferably approximately 0.010 inch. In the "cold" condition, the backing plate 42 is radially spaced at a distance BB from the rotor member 24, the distance BB being sufficiently great for preventing contact withe the rotor member, yet sufficiently small for supporting the bristle members 44 against upstream air pressure. In the above example, a preferred value for the distance BB is approximately 0.170 inch. The backing plate 42 is also tapered inwardly and forwardly for fail-safe limitation of rotor contact in the event of abnormal operating conditions. Under design conditions, the clearance distance BD is contemplated to be somewhat less than in the cold condition in which the machine 10' is characterized, but not so much less as to create contact. If testing shows otherwise, the clearance distance BD is preferably to be made slightly larger.

It is contemplated that the brush seal 40 be added to existing turbine machines 10 having worn labyrinth seals 22 as described above. In the present invention this facilitated by the need for modification of the insert ring 32 only. Particularly, the adapter ring 32' can be formed by axially shortening the existing insert ring 32, forming an annular channel as indicated at 54, and forming threaded openings 56 for the fasteners 50. The adapter ring 32' can be segmented as described above in connection with the insert ring 32.

It is also contemplated that the brush seal 40 be used in "fresh" installations having no wear of the labyrinth seal 22. In such cases, the labyrinth seal radial spacing LD, which is only 0.03 inch, quickly increases as a result of wear during shut-down as described above. Nevertheless, it may be desired to augment the flow of cooling air into the chamber 28. Accordingly, and as shown in FIG. 4, the barrel member 18 is preferably provided with one or more threaded passages 60. Selected ones of the passages 60 are closed or partially blocked by respective plugs 62 and/or jets 64.

Also, some or all of the passages 60 can be fluid-connected to an auxiliary source 66 of pressure air as shown in FIG. 5. More particularly, the outer barrel member 36 of the turbine machine 10 is provided with one or more fluid ports 70, an inner conduit 72 being fluid-connected between each port 70 and a corresponding one of the threaded passages 60, an outer conduit 74 being fluid-connected between the port(s) 70 and the auxiliary source 66 and having an adjustable valve 76 series-connected therein for adjustably restricting the flow of auxiliary cooling air into the chamber 28 of the inner barrel member. Preferably the valve 76 is a calibrated needle valve for facilitating repeatable adjustment thereof in response to a monitored operating parameter of the machine 10. The monitored operating parameter can be an inside temperature of the inner barrel member 18, which grows to exceed a preferred value if the brush seal 40 is excessively effective in restricting the flow of cooling air from the compressor 12 into the chamber 28. FIG. 5 shows a thermocouple temperature sensor 78 that is normally provided with the machine 10 of FIGS. 1–3, the sensor 78 having a conventional indicator 80 associated therewith. Manual control of the needle valve 76 in response to readings of the indicator is appropriate in that the start-up sequence of FIG. 3 is sufficiently slow. The auxiliary source 66 must be maintained at greater pressure than that of the chamber 28 for assuring the proper direction of flow. It will be understood that at least a portion of the auxiliary source 66 can be provided by the compressor 12. Indeed, when any of the passages 60 are left open or provided with jets 64, but not the inner and outer conduits 72 and 74, that portion of the auxiliary source 66 is the last stage of the compressor 12. Also, it may be preferred to take from an earlier stage of the compressor 12, or from an independent source, to provide the auxiliary source 66 for reasons of greater efficiency and/or reduced cost.

The turbine machine 10' of the present invention provides improved control of cooling air into the chamber 28 for significantly increased output and efficiency in typical large power plant installations. Under conditions presently encountered, it is believed that the present invention will provide approximately 1.5 megawatts of additional power output from a typical installation of the Frame-7 machine, resulting in a savings on the order of $250,000 per machine, the installation cost being on the order of $30,000.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A method for controlling cooling air flow in a turbine power plant having a multistage axial compressor, a turbine shaft-coupled to a rotor of the compressor, a combustor fluid coupled between the compressor and the turbine, and a labyrinth seal between the rotor and a stationary inner barrel member, the rotor having a cylindrical land region of diameter D, comprising the steps of:

(a) providing a brush seal having a ring-shaped holder, a multiplicity of bristle members extending radially inwardly from the holder toward the land region of the rotor, outer extremities of the bristle members being rigidly retained relative to the holder;
   (b) connecting the brush seal in augmenting relation to the labyrinth seal; and
   (c) spacing the bristle members from the land region of the rotor by an ambient temperature clearance of not less than 0.015 percent of the diameter D when the power plant is inactive;
   (d) providing an auxiliary source of pressure air;
   (e) fluid-connecting the auxiliary source to an interior cavity portion of the inner barrel member for augmenting the flow of cooling air;
   (f) connecting an adjustable valve between the auxiliary source and the inner barrel member for variably restricting air flow from the auxiliary source and the inner barrel member;
   (g) monitoring an operating parameter of the power plant; and
   (h) adjusting the adjustable valve in response to changes in the operating parameter.

2. A stationary gas turbine engine for a power plant, comprising:

(a) a multistage axial compressor, the compressor having a rotor, the rotor having a cylindrical land region downstream of a last-stage of the compressor, the land region having an outside diameter D;
   (b) a turbine shaft-coupled to the rotor of the compressor;
   (c) a combustor fluid coupled between the compressor and the turbine;
   (d) a stationary inner barrel member downstream of the compressor, air flowing from the compressor to the combustor passing outside of the inner barrel member, a chamber within the inner barrel member forming a main passage for cooling air from the compressor, the cooling air flowing from the chamber and being mixed with combustion gases upstream of the turbine; and
   (e) a brush seal for restricting air passage into the chamber from the compressor, the brush seal comprising:
      (i) a ring-shaped holder;
      (ii) a multiplicity of bristle members extending radially inwardly from the holder toward the land region of the rotor, outer extremities of the bristle members being rigidly retained relative to the holder; and
      (iii) the holder being fastened to the inner barrel member;
   (f) a barrel passage extending through one wall of the inner barrel for passing air therethrough downstream of the brush seal, thereby altering the flow of cooling air from the chamber to be mixed with the combustion gases upstream of the turbine; and
   (g) an auxiliary source of pressure air connected to the barrel passage for augmenting air flow into the main passage, thereby augmenting cooling air flow from the main passage to be mixed with the combustion gases, wherein, when the power plant is inactive, the bristles have an ambient temperature clearance of not less than 0.015 percent of the diameter D from the land region of the rotor.

3. The engine of claim 2, further comprising:
   (a) a valve for adjustably restricting flow of pressure air into the chamber from the auxiliary source of pressure air; and
   (b) an instrument for monitoring an operating parameter of the engine, the operating parameter being responsive to the flow of cooling air from the chamber.

4. The engine of claim 3, wherein the valve is a calibrated needle valve.

5. The engine of claim 3, wherein the instrument comprises a temperature sensor for indicating a temperature within the chamber.

6. The engine of claim 3, further comprising an outer barrel surrounding the inner barrel and having a fluid port extending radially through one wall thereof, the gas flow from the compressor to the combustor passing between the outer barrel and the inner barrel, a fluid conduit connected within the outer barrel between the barrel passage and the fluid port, and the auxiliary source of pressure air being connected to the fluid port external of the outer barrel, whereby air from the auxiliary source flows into the chamber in pressure isolation from the air flowing to the combustor.

7. The engine of claim 2, wherein the compressor provides at least a portion of the auxiliary source.

8. In a turbine power plant having a multistage axial compressor, a turbine shaft-coupled to a rotor of the compressor, a combustor fluid-coupled between the compressor and the turbine, and a labyrinth seal between the rotor and a stationary inner barrel member, the rotor having a cylindrical land region of diameter D, a chamber within the inner barrel member forms a passage for cooling air from the compressor, the improvement comprising:

(a) a brush seal connected to the inner barrel and augmenting the labyrinth seal, being fluid connected in series therewith, the brush seal comprising:
      (i) a ring-shaped holder;
      (ii) a multiplicity of bristle members extending radially inwardly from the holder toward the land region of the rotor, outer extremities of the bristle members being rigidly retained relative to the holder; and
      (iii) the holder being fastened to the inner barrel member;
   (b) barrel passage extending through one wall of the inner barrel for passing air therethrough downstream of the brush seal, thereby altering the flow of cooling air from the chamber to be mixed with the combustion gases upstream of the turbine;
   (c) an auxiliary source of pressure air connected to the barrel passage for augmenting air flow into the main passage, thereby augmenting cooling air flow from the main passage to be mixed with the combustion gases, wherein, when the power plant is inactive, the bristles have an ambient temperature clearance of not less than 0.015 percent of the diameter D from the land region of the rotor.

9. In the turbine power plant of claim 8, wherein the improvement further comprises:
   (a) a valve for adjustably restricting flow of pressure air into the chamber from the auxiliary source of pressure air; and
   (b) an instrument for monitoring an operating parameter of the engine, the operating parameter being responsive to the flow of cooling air from the chamber.

10. In the turbine power plant of claim 9, the further improvement wherein the valve is a calibrated needle valve.

11. In the turbine power plant of claim 9, the further improvement wherein the instrument comprises a temperature sensor for indicating a temperature within the chamber.

12. In the turbine power plant of claim 9, the power plant also having an outer barrel surrounding the inner barrel, the gas flow from the compressor to the combustor passing between the outer barrel and the inner barrel, the further improvement comprising a fluid port extending radially through one wall of the outer barrel, a fluid conduit connected between the barrel passage and the fluid port, and the auxiliary source of pressure air being connected to the fluid port external of the outer barrel, whereby air from the auxiliary source flows into the chamber in pressure isolation from the air flowing to the combustor.

* * * * *